United States Patent [19]

Schäfer et al.

[11] 4,065,410

[45] Dec. 27, 1977

[54] POLYURETHANE FOAMS HAVING AN INTEGRAL SKIN USING A MIXTURE OF POLYOLS AS THE CHAIN EXTENDER

[75] Inventors: Hermann Schäfer, Leverkusen; Christian Weber, Cologne, both of Germany

[73] Assignee: Bayer Aktiengesellschaft, Leverkusen, Germany

[21] Appl. No.: 669,071

[22] Filed: Mar. 22, 1976

[30] Foreign Application Priority Data

Mar. 27, 1975 Germany .............................. 2513817

[51] Int. Cl.² ............................................. C08G 18/28
[52] U.S. Cl. .............................. 260/2.5 AM; 252/182; 260/2.5 AZ
[58] Field of Search ................... 260/2.5 AM, 2.5 AZ; 252/182

[56] References Cited

U.S. PATENT DOCUMENTS

| | | | |
|---|---|---|---|
| 3,523,918 | 8/1970 | Gonzalez | 260/2.5 AZ |
| 3,555,130 | 1/1971 | Feuer et al. | 260/2.5 AZ |
| 3,590,012 | 6/1971 | Hauptmann et al. | 260/2.5 AZ |
| 3,767,743 | 10/1973 | Hostettler et al. | 260/2.5 AZ |
| 3,772,221 | 11/1973 | Hostettler et al. | 260/2.5 AZ |
| 3,795,636 | 3/1974 | Huffman et al. | 260/2.5 AZ |
| 3,925,527 | 12/1975 | Kleinmann et al. | 260/2.5 AZ |

*Primary Examiner*—Eugene C. Rzucidlo
*Attorney, Agent, or Firm*—Gene Harsh; Joseph C. Gil

[57] ABSTRACT

This invention relates to a process for making polyurethane elastomer moldings from
a. organic polyisocyanates
b. polyhydroxyl compounds having molecular weights in the range from about 1800 to about 10,000,
c. a chain extender,
d. a blowing agent and
e. optionally the auxiliaries and additives commonly used in making polyurethanes, the improvement wherein said chain extender (c) is a polyol mixture comprising
  i. ethylene glycol and
  ii. at least one other polyol having a molecular weight below 1800 and wherein said polyol mixture has an average molecular weight below about 600.

10 Claims, No Drawings

POLYURETHANE FOAMS HAVING AN INTEGRAL SKIN USING A MIXTURE OF POLYOLS AS THE CHAIN EXTENDER

BACKGROUND OF THE INVENTION

It is generally known that moldings having a compact surface can be produced from polyurethane foams by in-mold foaming (e.g. German Auslegeschrift No. 1,196,864), by introducing into a mold, a reactive and foamable mixture based on compounds containing several reactive hydrogen atoms and polyisocyanates. Suitable compounds containing reactive hydrogen atoms include polyethers and polyesters containing hydroxyl groups. Suitable polyisocyanates include 2,4- and 2,6-tolylene diisocyanates, their isomer mixtures and the polyphenyl polymethylene polyisocyanates obtained by condensing aniline with formaldehyde, followed by phosgenation. Water and/or fluorochlorinated hydrocarbons may be used as blowing agents. Catalysts of the type commonly used in the production of polyurethane foams are also generally used. Providing the components are suitably selected, it is possible to produce both elastic and rigid foams.

Polyurethane foams having a compact outer skin, so-called integral skin foams, have been produced on a commercial scale for a long time (Kunststoffe 60 [1970], No. 1, pages 3 to 7).

Heavy stressed moldings can be produced from linear or slightly branched starting materials which give materials having a range of properties resembling that of elastomers. Moldings of this kind are used, for example, in the automobile industry.

The starting materials are preferably processed by the so-called reaction injection-molding technique (RIM-technique). This is a filling process, in which the highly active, liquid starting components are quickly introduced into the mold through high-output, high-pressure metering units after admixture in positively controlled mixing heads. Moldings weighing 6 to 10 kg are produced in 2 to 4 minutes, depending on wall thickness. Mixtures of substantially linear polyhydroxyl compounds of high molecular weight, 1,4-butane diol as a chain extender, and blowing agents are normally reacted with diisocyanates or polyisocyanates to produce moldings of this kind. To be useful, the elasticity modulus of these elastomers should be substantially unaffected by temperature. Thus, elastomers should be sufficiently stiff under heat, but still flexible when cold.

It was subsequently found that this property was best obtained by using ethylene glycol as chain extender. Unfortunately, materials produced in this way have the disadvantage of a totally inadequate surface hardness on removal from the mold (inadequate "green strength"). This inadequate green strength is reflected in the appearance of cracks in the surface of the molding on bending and in separation of the surface layer, even at mold temperatures of 50° C. In addition, it was found that the flash around the sealing surfaces of a mold is extremely brittle, does not form a coherent film and, hence, complicates cleaning of the mold. Although these properties can be slightly improved by raising the mold temperature, this measure has a negative effect upon the stiffness of the molding when it is removed from the mold. Accordingly, it is virtually impossible to produce moldings by the RIM process which satisfy all practical requirements on a commercial scale even in cases where ethylene glycol is used as a chain extender.

DESCRIPTION OF THE INVENTION

It has now surprisingly been found that moldings having excellent green strength can be obtained by the procedure described above, providing at least one other polyhydroxyl compound is added to the ethylene glycol. In this way, elastomers are able to withstand removal from molds with undercuts, in which the molding has to be stretched to a considerable extent, without developing any surface cracks.

Accordingly, the present invention relates to a process for the production of moldings having a compact peripheral zone and a cellular core from polyurethane elastomers by the in-mold foaming of a foamable reaction mixture comprising:

a. organic polyisocyanates,
b. polyhydroxyl compounds having molecular weights in the range from about 1800 to about 10,000,
c. a polyol mixture with an average molecular weight below about 600 acting as chain extender,
d. the usual blowing agents and
e. optionally the auxiliaries and additives commonly used in polyurethane chemistry, distinguished by the fact that a mixture of
i. ethylene glycol with
ii. at least one other polyol having a molecular weight below about 1800 is used as the chain extender (c).

Starting components (a) suitable for use in the invention include aliphatic, cycloaliphatic, araliphatic, aromatic and heterocyclic polyisocyanates of the type described, for example, by W. Siefken in Justus Liebigs Annalen der Chemie, 562, pages 75 to 136. These include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate as well as mixtures of these isomers; 1-isocyanato-3,3,5-trimethyl-5-isocyanatomethyl cyclohexane (U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and any mixtures of these isomers; diphenyl methane-2,4' and/or -4,4'-diisocyanate; naphthylene-1,5-diisocyanate; triphenyl methane-4,4',4''-triisocyanate; polyphenyl polymethylene polyisocyanates of the type obtained by condensing aniline with formaldehyde followed by phosgenation, and which are described in British patent specification Nos. 874,430 and 848,671; m- and p-isocyanatophenyl sulphonyl isocyanates as described by U.S. Pat. No. 3,454,606; perchlorinated aryl polyisocyanates of the type described in U.S. Pat. No. 3,277,138, polyisocyanates containing carbodiimide groups of the type described in U.S. Pat. No. 3,152,162; diisocyanates of the type described in U.S. Pat. No. 3,492,330; polyisocyanates containing allophanate groups of the type described in British patent specification No. 994,890; Belgian Pat. No. 761,626 and published Dutch Patent Application No. 7,102,524; polyisocyanates containing isocyanurate groups of the type described in U.S. Pat. No. 3,001,973, German Pat. Nos. 1,022,789; 1,222,067 and 1,027,394 and German Offenlegungsschrift No. 1,929,034 and 3,004,048; polyisocyanates containing urethane groups of the type described in Belgian Pat. No. 752,261 or U.S. Pat. No. 3,394,164; polyisocyanates containing acylated urea groups according to German Pat. No. 1,230,778; polyisocyanates containing biuret groups of the type described in U.S. Pat. No. 3,124,605 and 3,201,372; polyisocyanates obtained by telomerization reactions of the type described in U.S. Pat. No. 3,654,106; polyisocyanates containing ester groups of the type described in British patents specification Nos. 965,474 and 1,027,956, U.S. Pat. No. 3,567,763 and German Pat. No. 1,231,688; reaction products of the above-mentioned isocyanates with acetals according to German Pat. No. 1,072,385; polyisocyanates containing polymeric fatty acid radicals according to U.S. Pat. No. 3,455,883.

Preferred starting components (a) are diphenyl methane diisocyanate containing carbodiimide and/or urethane imine groups, as described in U.S. Pat. No. 3,152,162 or polyisocyanates containing urethane groups, of the type obtained by reacting 1 mol of 4,4'-diisocyanato diphenyl methane with 0.05 to 0.3 mol of low molecular weight diols or triols, preferably polypropylene glycols having a molecular weight below 700. Mixtures of these preferred polyisocyanates are also preferably used.

Polyhydroxy polyalkylene polyethers having molecular weights in the range from about 1800 to about 10,000 and preferably in the range from 2000 to 5000, are preferably used as component (b) in the process of the invention. Polyethers containing at least 2 and preferably 2 to 3 hydroxyl groups are suitable for use in the invention, are known, and are obtained, for example, by the polymerization of epoxides, such as ethylene oxide, propylene oxide, butylene oxide, tetrahydrofuran, styrene oxide or epichlorohydrin alone, for example in the presence of $BF_3$, or by the chemical addition of these epoxides, optionally in admixture with or in succession to starter components having reactive hydrogen atoms. Such starter compounds include water, alcohols, or amines, such as ethylene glycol, 1,3- or 1,2-propylene glycol, trimethylol propane, 4,4'-dihydroxy diphenyl propane, aniline, ammonia, ethanolamine and ethylene diamine. In many cases, it is preferred to use polyethers of the kind which contain predominant amounts of primary OH-groups (up to 90% by weight, based on all the OH-groups present in th polyether). Polyethers modified by vinyl polymers of the type obtained by the polymerization of styrene and/or acrylonitrile in the presence of polyethers (U.S. Pat. Nos. 3,383,351; 3,304,273; 3,523,093; 3,110,695, German Pat. No. 1,152,536) are also suitable, as are polybutadienes containing OH-groups.

Polyesters, polythioethers, polyacetals, polycarbonates and polyester amides containing hydroxyl groups of the type commonly used for the production of homogeneous and cellular polyurethanes, may also be used in appropriate proportions. Examples of suitable polyesters containing hydroxyl groups are reaction products of polyhydric (preferably dihydric and, optionally, trihydric) alcohols with polybasic (preferably dibasic carboxylic acids. Instead of free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example, by halogen atoms, and/or may be unsaturated. These polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally in admixture with monomeric fatty acids, terephthalic acid dimethyl ester and terephthalic acid-bis-glycol ester. Suitable polyhydric alcohols include ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones like ε-caprolactone or hydroxy carboxylic acids, like ε-hydroxy caproic acid, may also be used.

Particular examples of polythioethers are the condensation products of thiodiglycol with itself and/or with other glycols, dicarboxylic acids, formaldehyde, amino carboxylic acids or amino alcohols. Depending upon the co-components, these products are polythio mixed ethers, polythioether esters or polythioether ester amides.

Suitable polyacetals include those compounds which can be obtained from glycols, such as diethylene glycol, triethylene glycol, 4,4'-dioxethoxy diphenyl dimethyl methane, hexane diol and formaldehyde. Other suitable polyacetals may be obtained by polymerizing cyclic acetals.

Suitable polycarbonates containing hydroxyl groups are those known per se. They are obtained for example, by reacting diols such as 1,4-propane diol, 1,4-butane diol and/or 1,6-hexane diol, diethylene glycol, triethylene glycol, tetraethylene glycol; with diaryl carbonates such as diphenyl carbonate or phosgene.

Examples of the polyester amides and polyamides are the predominantly linear condensates obtained from polyhydric saturated and unsaturated amino alcohols, diamines, polyamines, and mixtures thereof.

Examples of these compounds are known and are described in High Polymers, Vol. XVI, "Polyurethanes, Chemistry and Technology", by Saunders-Frisch, Interscience Publishers, New York-London, Vol. I (1962), pages 32–42 and pages 44–54, and Vol. II (1964), pages 5–6 and pages 198–199 and in Kunststoff-Handbuch, Vol. III, Vieweg-Hochtlen, Carl-Hanser-Verlag, Munich (1966) on pages 45–71.

The conventional polyhydroxy polyethers of polyurethane chemistry having molecular weights in the range from about 1800 to about 10,000, preferably from 2000 to 5000 and which contain 2 or 3, preferably 2 hydroxyl groups, are preferably used as sole component (b). Mixtures of the polyethers may also be used.

The chain extender mixture (c) comprises (i) ethylene glycol in admixture with at least one other polyol (ii) having a molecular weight below about 1800, component (ii) preferably being used in quantities of from about 5 to about 30% by weight, based on (i) + (ii). The mixture must have an average molecular weight below 600.

It has proved to be best to use component (ii) in the above-noted quantity in order to obtain an adequate improvement in "green strength" while at the same time being able to obtain the required property spectrum with minimal dependence of the elasticity modulus upon temperature.

The chain extender mixture (c) is preferably used in quantities of from 10 to 30% by weight, more especially in quantities of from 15 to 25% by weight, based on component (b).

Suitable compounds which represent component (ii) either individually or in admixture include any difunctional or polyfunctional hydroxyl compounds having a molecular weight below about 1800 such as, 1,2- and 1,3-propylene glycol; 1,4- and 2,3-butylene glycol; 1,6-hexane diol; 1,8-octane diol; neopentyl glycol; cyclohexane dimethanol (1,4-bis-hydroxy-methyl cyclohexane); 2-methyl-1,3-propane diol; glycerol; trimethylol propane; 1,2,6-hexane triol; 1,2,4-butane triol; trimethylol ethane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. It is of course also possible to use polyols containing further hetero atoms such as nitrogen or sulphur, or double bonds. These include, N-methyl diethanolamine; N-ethyl diethanolamine; di-$\beta$-hydroxy ethyl aniline; N-cyclohexyl diethanolamine; triethanolamine, di-$\beta$-hydroxy ethyl sulphide; 2-butene-1,4-diol; di-$\beta$-hydroxy ethyl urea; and di-$\beta$-hydroxy ethyl urethane.

Polyalkylene glycol ethers obtained by the addition of alkylene oxides, such as ethylene oxide, propylene oxide, butylene oxide, tetrahydrofuran, with such compounds as polyfunctional alcohols, amino alcohols or amines, are also suitable.

Diols and triols which have a hydroxy equivalent weight of from about 30 to about 600, preferably from 30 to 250, and which contain primary hydroxyl groups, have proved to be particularly suitable. Trimethylol propane is preferably used as component (ii). It is also preferred to use triethanolamine and 1,6-hexane diol.

Water and/or readily volatile organic substances are used as blowing agent (d) in the invention. Suitable organic blowing agents include halogen-substituted alkanes, such as methylene chloride, chloroform, ethylidene chloride, vinylidene chloride, monofluorotrichloromethane, difluorochloromethane and difluorodichloromethane, and butane, hexane, heptane, or diethyl ether. A blowing effect may also be obtained by adding compounds which decompose spontaneously at temperatures above room temperature, giving off gases such as nitrogen. Examples of such compounds are azo compounds, such as azoisobutyronitrile. Further examples of blowing agents and details on the use of blowing agents may be found in Kunststoff-Handbuch, Vol. VII, published by Vieweg and Hochtlen, Carl-Hanser-Verlag, Munich (1966) on pages 108 and 109, 453–455 and 507–510.

Catalysts may also be used in the invention. Suitable catalysts include those known per se, for example tertiary amines such as triethylamine, tributylamine, N-methylmorpholine, N-ethylmorpholine, N-cocomorpholine, N,N,N',N'-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-$\beta$-phenylethylamine, 1,2-dimethylimidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

Other suitable catalysts are silaamines having carbon silicon bonds of the kind described in German Pat. No. 1,229,290. These include 2,2,4-trimethyl-2-silamorpholine and 1,3-diethylaminomethyl tetramethyl disiloxane.

Nitrogen-containing bases such as tetraalkyl ammonium hydroxides; alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and detailson the way in which the catalysts work can be found in Kunststoff-Handbuch, Vol. VII, published by Vieweg and Hochtlen, Carl-Hanser-Verlag, Munich 1966 pages 96–102.

The catalysts are generally used in quantities of from about 0.001 to 10% by weight, based on the quantity of compounds (b).

Surface-active additives (emulsifiers and foam stabilizers) can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

Suitable foam stabilizers include water-soluble polyether siloxanes. These compounds are generally of such structure that a copolymer of ethylene oxide and propylene oxide is attached to a polydimethylsiloxane radical. Foam stabilizers of this kind are described, for example, in U.S. Pat. No. 2,764,565.

It is also possible to use reaction retarders, for example, substances with an acid reaction such as hydrochloric acid or organic acid halides. Cell regulators known per se such as paraffins or fatty alcohols or dimethyl polysiloxanes may also be used. Pigments or dyes and flameproofing agents known per se, such as tris-chloroethyl phosphate or ammonium phosphate and polyphosphate may be used. Stabilizers against the effects of ageing and weather, plasticizers and substanaces with fungistatic and bacteriostatic effects, fillers such as barium sulphate, kieselguhr, carbon black or prepared chalk may also be used.

Further examples of the surface-active additives and foam stabilizers and of cell regulators, reaction retarders, stabilizers, flameproofing agents, plasticizers, dyes, fillers, substances with fungistatic and bacteriostatic effects and also details on the way in which these additives are used and how they work, can be found in Kunststoff-Handbuch, Vol. VII, published by Vieweg and Hochtlen, Carl-Hanser-Verlag, Munich (1966), pages 103 to 113.

The polyisocyanate (component a) is preferably used in such a quantity that the foamable mixture has an isocyanate value of from about 90 to about 120, more especially from about 95 to about 110. The isocyanate value is the quotient of the number of isocyanate groups and the number of isocyanate-reactive groups multiplied by 100.

The process of the invention is preferably carried out by the known reaction injection-molding technique (RIM technique). The foamable mixture is preferably introduced into the mold in such a quantity that the molding has a density of from 0.8 to 1.1 g/cc.

Conventional external and/or internal mold-release agents of the type described, for example, in German Offenlegungsschrifts Nos. 1,953,637 and 2,121,670, may also be used.

The moldings obtainable by the process of the invention are particularly suitable for the production of flexible automobile fenders and bodywork components.

EXAMPLES

The starting materials mentioned in the following examples are processed by means of so called high pressure dosing units: the components are delivered by special pumps (e.g. BOSCH-piston pumps, yielding high pressure of about 100–300 atmospheres) to the mix head (spring loaded nozzle mix head or hydraulically forced mix head), where they are thoroughly mixed by countercurrent injection (HK-machines from Hennecke or equivalent types of machines from other manufacturers as KRAUSS-MAFFEI, SIEMAG, CANNON).

For the mechanical tests, plates measuring 120×20×0,4cm are made up in a temperable metal plate mold made of aluminum (Constructal 20/52) or nickel-plated steel to ensure good surface qualities of the moldings. The mold is filled from the longitudinal side through a bar gated. A waxe typ release agent, giving rather dry and mat surfaces of the moldings was used for the mold release (Acmosil P180 ST, which is a product of ACMOS Chemische Fabrik Tietjen u. Co., Postfach 833, 2800 Bremen 1). Generally, however, other release agents based on waxes and silicones may also be used for the purposes of the invention. The invention is by no means confined to the above-mentioned machines, and may be carried out equally effectively with stirrer-equipped machines or friction-mixing machines.

EXAMPLE 1 (Comparison)

69.50 parts by weight of a linear polyether having an OH-number of 28, obtained by the addition of propylene oxide and then ethylene oxide with propylene glycol,
9.80 parts by weight of a polyether having an OH-number of 35, obtained by the addition of propylene oxide and then ethylene oxide with trimethylol propane,
17.00 parts of weight of ethylene glycol,
0.10 part by weight of water,
0.48 part by weight of triethylene diamine,
0.03 part by weight of dibutyl tin dilaurate and
3.20 parts by weight of methylene chloride are combined to form a polyol component and processed with 91.00 parts by weight of a mixture of two polyisocyanates having an isocyanate content of 28%.

The mixture of the polyisocyanates has the following composition:

25 parts by weight of a reaction product of tripropylene glycol and diphenyl methane diisocyanate having an isocyanate content of 23%,
75 parts by weight of a diphenyl methane diisocyanate, partly converted into carbodiimide form, having an isocyanate content of 30%.

The temperature of the starting materials is 45° C, while the temperature of the plate mold is adjusted to 50° C. The in-mold time is 2 minutes.

Following removal from the mold, the polyurethane elastomer obtained shows partial separation of the skin from the surface and, on bending, very serious crack formation in the peripheral zone.

Although it is possible, by raising the temperature of the plate mold to 70° C, to prevent separation of the skin, crack formation still occurs in the peripheral zone. The test plate is tempered for 1 hour at 120° C. The test plate is then found to have the following mechanical properties:

| | |
|---|---|
| Density (kg/cm³) | 990 |
| Tensile strength (MPa) | 20.6 |
| Elongation at break (%) | 181 |
| Notch-free tear propagation resistance (kN/m) | 78 |
| Tensile stress at 50% elongation (MPa) | 12.3 |
| Shore D-hardness | 51 |
| E-modulus (MPa) +65° C | 115 |
| RT | 220 |
| −30° C | 530 |

EXAMPLE 2

69.50 parts by weight of a linear polyether having an OH-number of 28, obtained by the addition of propylene oxide and then ethylene oxide with propylene glycol,
9.80 parts by weight of a polyether having an OH-number of 35, obtained by the addition of propylene oxide and then ethylene oxide with trimethylol propane,
15.40 parts by weight of ethylene glycol and 1.60 parts by weight of trimethylol propane as chain-extender mixture,
0.10 part by weight of water,
0.48 part by weight of triethylene diamine,
0.03 part by weight of dibutyl tin dilaurate and
3.20 parts by weight of methylene chloride are combined to form a polyol component and processed with 89.00 parts by weight of the polyisocyanate mixture according to Example 1. The mold temperature, starting material temperature and in-mold time are the same as in Example 1. The elastomer obtained can be removed from the mold without any surface faults, and on bending, does not show any crack formation in its peripheral zone.

The test plate is tempered for 1 hour at 120° C.
The test plate is then found to have the following mechanical properties:

| | |
|---|---|
| Density (kg/m³) | 997 |
| Tensile strength (MPa) | 18.9 |
| Elongation at break (%) | 164 |
| Notch-free tear propagation resistance (kN/m) | 80 |
| Tensile stress at 50% elongation (MPa) | 10.9 |

EXAMPLE 3

70.00 parts by weight of the linear polyether according to Example 1 having a hydroxyl number of 28,
10.00 parts by weight of the polyether according to Example 1 having an OH-number of 35,
16.00 parts by weight of ethylene glycol and 3.50 parts by weight of 1,6-hexane diol as chain-extender mixture,
0.50 part by weight of triethylene diamine,
0.05 part by weight of dibutyl tin dilaurate and
3.00 parts by weight of monofluorotrichloromethane are mixed and processed with 92.5 parts by weight of the polyisocyanate mixture according to Example 1.

The process conditions are the same as in Example 1.

The elastomer obtained can be removed from the mold without any surface faults and, on bending, does not show any crack formation in its peripheral zone.

The test plate is tempered for 30 minutes at 120° C.

The test plate is then found to have the following mechanical properties:

| Density (kg/m$^3$) | | 1006 |
|---|---|---|
| Tensile strength (MPa) | | 25.2 |
| Elongation at break (%) | | 195 |
| Notch-free tear propagation resistance (kN/m) | | 90 |
| Tensile stress at 50% elongation (MPa) | | 15.3 |
| Shore D-hardness | | 56 |
| E-modulus (MPa) | +65° C | 140 |
| | RT | 360 |
| | −30° C | 1070 |

EXAMPLE 4

75.00 parts by weight of the linear polyether according to Example 1 having an OH-number of 28,
8.40 parts by weight of the polyether according to Example 1, having an OH-number of 35,
10.00 parts by weight of ethylene glycol and 0.84 parts by weight of triethanolamine as chain-extender mixture,
0.10 part by weight of water,
0.50 part by weight of triethylene diamine,
0.03 part by weight of dibutyl tin dilaurate,
3.30 parts by weight of monofluorotrichloromethane and
1.70 parts by weight of methylene chloride are mixed and processed with 59.5 parts by weight of the polyisocyanate mixture according to Example 1. The process conditions are the same as in Example 1.

The test plate is found to have the following mechanical properties:

| Density (kg/m$^3$) | | 908 |
|---|---|---|
| Tensile strength (MPa) | | 12.2 |
| Elongation at break (%) | | 234 |
| Notch-free tear propagation resistance (kN/m) | | 54 |
| Tensile stress at 50% elongation (MPa) | | 5.3 |
| Shore D-hardness | | 35 |
| E-modulus (MPa) | +65° C | 34 |
| | RT | 75 |
| | −30° C | 290 |

EXAMPLE 5

100.00 parts by weight of the polyol mixture according to Example 2 are processed with 107.50 parts by weight of a reaction product of tripropylene glycol and diphenyl methane diisocyanate with an isocyanate content of 23%. The process conditions are the same as in Example 1. The elastomer obtained can be removed from the mold without any surface faults and, on bending, does not show any crack formation in its peripheral zone.

The test plate is tempered for 30 minutes at 120° C.

The test plate is then found to have the following mechanical properties:

| Density (kg/m$^3$) | | 1008 |
|---|---|---|
| Tensile strength (MPa) | | 20.3 |
| Elongation at break (%) | | 219 |
| Notch-free tear propagation resistance (kN/m) | | 110 |
| Tensile stress at 50% elongation (MPa) | | 14.4 |
| Shore D-hardness | | 62 |
| E-modulus (MPa) | +65° C | 170 |
| | RT | 580 |
| | −30° C | 1400 |

EXAMPLE 6

40.00 parts by weight of the linear polyether according to Example 1 having an OH-number of 28,
40.00 parts by weight of the polyether according to Example 1 having an OH-number of 35,
15.20 parts by weight of ethylene glycol and 0.80 part by weight of trimethylol propane as chain extender,
0.10 part by weight of water,
0.48 part by weight of triethylene diamine,
0.03 part by weight of dibutyl tin dilaurate and
3.20 parts by weight of methylene chloride are combined to form a polyol component and processed with 86.50 parts by weight of the polyisocyanate mixture according to Example 1.

The elastomer obtained can be removed from the mold without any surface faults and, on bending, does not show any cracks in its peripheral zone.

The test plate is tempered for 45 minutes at 120° C.

The text plate is then found to have the following mechanical properties:

| Density (kg/m$^3$) | | 988 |
|---|---|---|
| Tensile strength (MPa) | | 20.0 |
| Elongation at break (%) | | 189 |
| Notch-free tear propagation resistance (kN/m) | | 94 |
| Tensile stress at 50% elongation (MPa) | | 10.4 |
| Shore D-hardness | | 50 |
| E-modulus (MPa) | +γ° C | 87 |
| | RT | 180 |
| | −30° C | 580 |

What is claimed is:
1. In a process for the production of polyurethane elastomer moldings having a compact peripheral zone and a cellular core by the in-mold foaming of a foamable reaction mixture which comprises
   a. organic polyisocyanate,
   b. polyhyroxyl compounds having molecular weights in the range from about 1800 to about 10,000,
   c. a chain extender,
   d. a blowing agent, and
   e. optionally the auxiliaries and additives commonly used in making polyurethanes, the improvement wherein said chain extender (c) is a polyol mixture comprising
i. ethylene glycol,
ii. at least one other polyol having a molecular weight of below 1800, and wherein said polyol mixture has an average molecular weight below about 600, wherein said component (ii) is used in quantities of from 5 to 30% by weight, based on the sum total of (i) plus (ii), wherein said chain extender (c) is used in quantities of from 10 to 30% by weight, based on component (b), and wherein polyisocyanate (a) is used in such a quantity that the foamable mixture has an isocyanate value of 90 to 120.

2. The process of claim 1 wherein at least diols or triols containing primary hydroxyl groups and having a hydroxyl equivalent weight of from about 30 to about 600 is used as said component (ii).

3. The process of claim 2 wherein said component (ii) is selected from the group consisting of trimethylol propane, triethanolamine and 1,6-hexane diol.

4. The process of claim 1 wherein compound (a) is selected from the group consisting of diphenyl methane diisocyanate containing carbodiimide and/or urethane imine groups, and polyisocyanates containing urethane groups.

5. The process of claim 1 wherein compound (b) is a polyhydroxy polyether.

6. The process of claim 1 wherein said isocyanate value is from 95 to 110.

7. The process of claim 2 wherein said diols and triols have a hydroxyl equivalent weight of from 30 to 250.

8. A polyol mixture useful in the preparation of polyurethanes which comprises
1. 70–90% by weight of a mixture of
   A. A linear polyether obtained by the addition of propylene oxide and then ethylene oxide with propylene glycol and
   B. a polyether obtained by the addition of propylene oxide and then ethylene oxide with trimethylol propane wherein the mixture has a molecular weight of from about 1800 to about 10,000,
2. 10–30% of a chain extender which comprises:
   C. 70–95% ethylene glycol and
   D. 5–30% of at least one other polyol having a molecular weight below 1800 wherein said chain extender has a molecular weight below about 600.

9. The polyol mixture of claim 8 wherein said linear polyether (A) has an OH number of about 28 and said polyether (B) has an OH number of about 35.

10. The polyol of claim 8 wherein triethylene diamine, dibutyl tin dilaurate and methylene chloride are included in the mixture.

* * * * *